Dec. 14, 1926.  
E. F. WARD  
1,610,401  
GUARD  
Filed Nov. 24, 1922
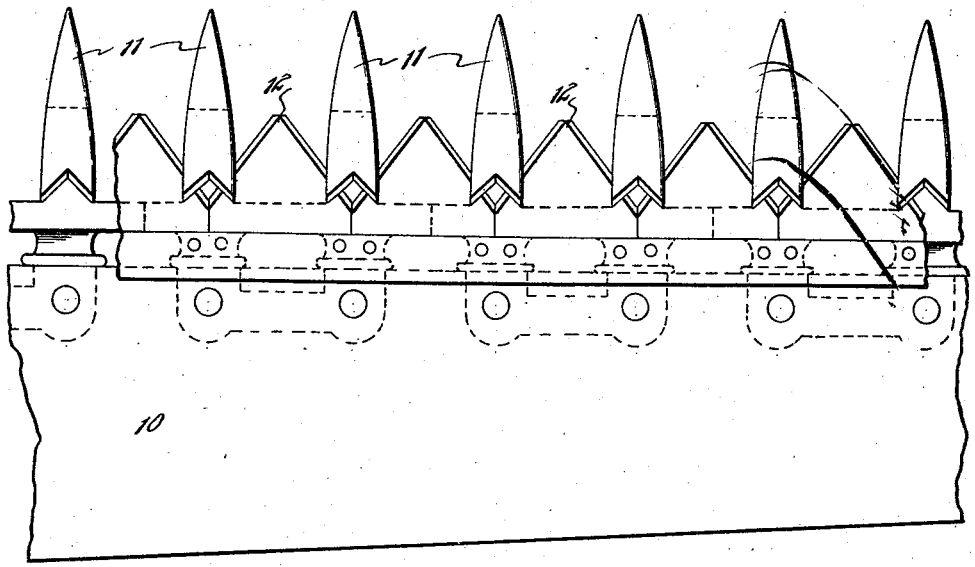
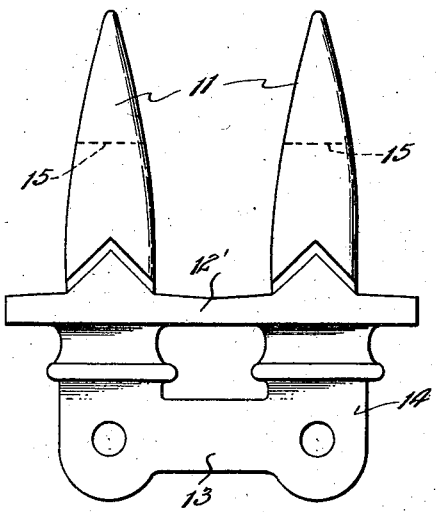
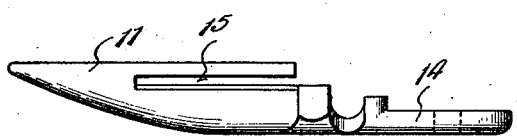
E. F. Ward INVENTOR Patented Dec. 14, 1926.

1,610,401

UNITED STATES PATENT OFFICE.

ELBERT F. WARD, OF SUTHERLIN, VIRGINIA.

GUARD.

Application filed November 24, 1922. Serial No. 603,007.

This invention relates to mowing machines, binders, and the like, and has particular application to the guards for the cutting blades.

The present invention contemplates constructing these guards in pairs with a view to materially strengthening the guards singly and collectively, and also minimizing the possibility of the guards being twisted or loosened from their connections with the finger bar, thereby holding the guards in proper position with relation to the cutting blades and assuring proper and efficient operation of the blades.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a fragmentary top plan view of the mower showing the construction and arrangement of the guards.

Figure 2 is a detail view of one pair of guards partly in section.

Figure 3 is a side elevation of the invention.

Referring to the drawings in detail, 10 indicates a finger bar to which is secured the guards 11 for the cutting blades 12. With a view of preventing these guards from being loosened at their connection with the finger bar, resulting in the guards moving slightly to one side of the blades, and causing the grass to hang in the guards and to be subsequently pulled up instead of being cut by the blades, until the machine is choked or the team stalled, I contemplate the construction of the guards 11 in pairs. The construction in accordance with the present invention is clearly illustrated in Figure 2, wherein the guards of said pair are of the usual configuration except that these guards are connected together by parallel members 12' and 13 respectively. The member 12' connects the heads 14 of the guards, while the member 13 connects the guards adjacent the corresponding ends of the slots 15 thereof. The member 12' extends entirely across the guards 11 and has its ends projecting laterally beyond the same. This member 12' defines a longitudinal shoulder which abuts the adjacent longitudinal edge of the finger bar. By the association of the guards in pairs in the manner described, each guard is afforded the strength of two guards, this resulting from the fact that the twin guards are connected to the finger bar at spaced points, or in other words by two bolts, in contradistinction to one bolt, these bolts passing through the heads of the guards as shown. Consequently, when the mower or the like comes in contact with an object that is hard to cut, the guards can not be disturbed, or shifted with relation to the cutting knives, but are always maintained in fixed relation thereto, assuring efficiency in the operation, and durability of the apparatus.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim—

A guard finger unit for sickles comprising a pair of guard fingers having slots for the passage of a cutter blade, a bar connecting the fingers adjacent the slots and extending beyond the sides thereof, means to secure the inner end of each finger to the finger bar of a sickle, a bar connecting the fingers adjacent the securing means and adapted to engage the under face of the finger bar and a rib extending across each guard finger to abut the edge of the finger bar.

In testimony whereof I affix my signature.

ELBERT F. WARD.